United States Patent
Chou et al.

(10) Patent No.: US 9,094,091 B2
(45) Date of Patent: Jul. 28, 2015

(54) METHOD AND APPARATUS FOR PERFORMING HANDS-FREE PROFILE CONTROL, AND ASSOCIATED COMPUTER PROGRAM PRODUCT

(71) Applicant: HTC Corporation, Taoyuan County (TW)

(72) Inventors: Huang-Chi Chou, Taoyuan County (TW); Che-Yu Hsu, Taoyuan County (TW); Hsun-Fen Hsieh, Taoyuan County (TW); Chih-Hao Hou, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 93 days.

(21) Appl. No.: 13/958,596

(22) Filed: Aug. 4, 2013

(65) Prior Publication Data

US 2014/0106675 A1 Apr. 17, 2014

Related U.S. Application Data

(60) Provisional application No. 61/712,795, filed on Oct. 11, 2012.

(51) Int. Cl.
*H04B 7/00* (2006.01)
*H04B 7/26* (2006.01)
*H04M 1/60* (2006.01)

(52) U.S. Cl.
CPC .............. *H04B 7/26* (2013.01); *H04M 1/6066* (2013.01); *H04M 2250/02* (2013.01)

(58) Field of Classification Search
CPC ....... H04W 12/06; H04W 12/00; H04W 4/12; H04W 64/00; H04B 7/26

USPC .......... 455/41.2, 557, 566, 418, 569.1, 575.1, 455/550.1
See application file for complete search history.

(56) References Cited

U.S. PATENT DOCUMENTS 7,715,831 B2 * 5/2010 Wakefield ..................... 455/418
7,715,873 B1 * 5/2010 Biere et al. .................... 455/557
(Continued)

OTHER PUBLICATIONS

Office action mailed on Mar. 26, 2014 for the Germany application No. 102013217744.5.

*Primary Examiner* — Marceau Milord
(74) *Attorney, Agent, or Firm* — Winston Hsu; Scott Margo

(57) ABSTRACT

A method and apparatus for performing hands-free profile (HFP) control and associated computer program product are provided. The method is applied to an electronic device. The method includes: establishing a plurality of Bluetooth (BT)-Asynchronous Connection-Less (ACL) links between the electronic device and a plurality of wireless accessory devices, respectively; and dynamically updating a default-active-device parameter in a device information table to be a unique identification of a specific wireless accessory device of the plurality of wireless accessory devices, in order to maintain a single BT-Synchronous Connection-Oriented (SCO) link between the electronic device and the specific wireless accessory device according to the default-active-device parameter, where the device information table includes unique identifications of the wireless accessory devices of which the BT-ACL links are established with the electronic device. For example, the electronic device can be an Audio Gateway (AG) device, and the wireless accessory devices can be Hands-Free Unit (HF) devices.

21 Claims, 13 Drawing Sheets

(56) References Cited

U.S. PATENT DOCUMENTS

| | | | |
|---|---|---|---|
| 7,813,715 B2* | 10/2010 | McKillop et al. | 455/410 |
| 7,937,067 B2* | 5/2011 | Maier et al. | 455/404.1 |
| 8,045,961 B2* | 10/2011 | Ayed et al. | 455/411 |
| 8,078,787 B2* | 12/2011 | Lydon et al. | 710/315 |
| 8,112,037 B2* | 2/2012 | Ketari | 455/41.3 |
| 8,112,066 B2* | 2/2012 | Ben Ayed | 455/411 |
| 8,115,609 B2* | 2/2012 | Ketari | 340/426.16 |
| 8,190,129 B2* | 5/2012 | Ben Ayed | 455/411 |
| 8,239,605 B2* | 8/2012 | Lydon et al. | 710/315 |
| 8,254,878 B2* | 8/2012 | Howard et al. | 455/404.2 |
| 8,260,262 B2* | 9/2012 | Ben Ayed | 455/411 |
| 8,442,481 B2* | 5/2013 | Maier et al. | 455/404.2 |
| 8,442,482 B2* | 5/2013 | Maier et al. | 455/404.2 |
| 8,467,770 B1* | 6/2013 | Ben Ayed | 455/411 |
| 8,498,618 B2* | 7/2013 | Ben Ayed | 455/411 |
| 8,505,072 B2* | 8/2013 | Tsukidate | 726/3 |
| 8,588,806 B2* | 11/2013 | Howard et al. | 455/456.1 |
| 8,755,767 B2* | 6/2014 | Maier et al. | 455/404.2 |
| 2005/0287981 A1* | 12/2005 | Hill | 455/404.1 |
| 2006/0030266 A1* | 2/2006 | Desai et al. | 455/41.2 |
| 2010/0151791 A1 | 6/2010 | Yi | |

* cited by examiner

METHOD AND APPARATUS FOR PERFORMING HANDS-FREE PROFILE CONTROL, AND ASSOCIATED COMPUTER PROGRAM PRODUCT

CROSS REFERENCE TO RELATED APPLICATIONS

This application claims the benefit of U.S. Provisional Application No. 61/712,795, which was filed on Oct. 11, 2012 and is entitled "Dual BT HFP handling on electronic device", and is included herein by reference.

BACKGROUND OF THE INVENTION

1. Field of the Invention

The present invention relates to accessory control of a portable electronic device, and more particularly, to a method for performing hands-free profile (HFP) control, and to an associated apparatus and an associated computer program product.

2. Description of the Prior Art

A conventional portable electronic device implemented according to the related art, such as a multifunctional mobile phone equipped with personal digital assistant (PDA) functionalities or a PDA equipped with mobile phone functionalities, may have become an essential part of everyday life since it is very helpful. In a situation where the conventional portable electronic device is designed to have many accessory devices, some problems may occur. For example, some of the accessory devices may need powerful processors and associated memory resources, causing the overall cost to be increased. In another example, the overall performance of the conventional portable electronic device and the accessory devices may be unacceptable to the user. Thus, a novel method is required for providing accessory control of an electronic device.

SUMMARY OF THE INVENTION

It is therefore an objective of the claimed invention to provide a method for performing hands-free profile (HFP) control, and to provide an associated apparatus and an associated computer program product, in order to solve the above-mentioned problems.

It is another objective of the claimed invention to provide a method for performing HFP control, and to provide an associated apparatus and an associated computer program product, in order to provide the user with high quality electronic devices and associated accessory devices.

According to at least one preferred embodiment, a method for performing HFP control is provided, where the method is applied to an electronic device. The method comprises the steps of: establishing a plurality of Bluetooth (BT)-Asynchronous Connection-Less (ACL) links between the electronic device and a plurality of wireless accessory devices, respectively; and dynamically updating a default-active-device parameter in a device information table to be a unique identification of a specific wireless accessory device of the plurality of wireless accessory devices, in order to maintain a single BT-Synchronous Connection-Oriented (SCO) link between the electronic device and the specific wireless accessory device according to the default-active-device parameter, wherein the device information table comprises a plurality of unique identifications of the wireless accessory devices of which the BT-ACL links are established with the electronic device. For example, the electronic device can be an Audio Gateway (AG) device, and the plurality of wireless accessory devices can be Hands-Free Unit (HF) devices.

According to at least one preferred embodiment, an apparatus for performing HFP control is also provided, where the apparatus comprises at least one portion of an electronic device. The apparatus comprises a processing circuit and a wireless control circuit, and the processing circuit is coupled to the wireless control circuit. The wireless control circuit is arranged to perform wireless communication control for the electronic device. In addition, the processing circuit is arranged to establish, by utilizing the wireless control circuit, a plurality of BT-ACL links between the electronic device and a plurality of wireless accessory devices, respectively, wherein the processing circuit dynamically updates a default-active-device parameter in a device information table to be a unique identification of a specific wireless accessory device of the plurality of wireless accessory devices, in order to maintain a single BT-SCO link between the electronic device and the specific wireless accessory device according to the default-active-device parameter, wherein the device information table comprises a plurality of unique identifications of the wireless accessory devices of which the BT-ACL links are established with the electronic device. For example, the electronic device can be an AG device, and the plurality of wireless accessory devices can be HF devices.

According to at least one preferred embodiment, a computer program product is also provided, where the computer program product has program instructions for instructing a processor of an electronic device to perform a method comprising the steps of: establishing a plurality of BT-ACL links between the electronic device and a plurality of wireless accessory devices, respectively; and dynamically updating a default-active-device parameter in a device information table to be a unique identification of a specific wireless accessory device of the plurality of wireless accessory devices, in order to maintain a single BT-SCO link between the electronic device and the specific wireless accessory device according to the default-active-device parameter, wherein the device information table comprises a plurality of unique identifications of the wireless accessory devices of which the BT-ACL links are established with the electronic device. For example, the electronic device can be an AG device, and the plurality of wireless accessory devices can be HF devices.

It is an advantage of the present invention that the aforementioned method, the aforementioned apparatus, and the aforementioned computer program product can enhance the overall performance of HFP control. In addition, the complexity of the control circuits in the accessory devices can be decreased, and therefore the associated costs can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
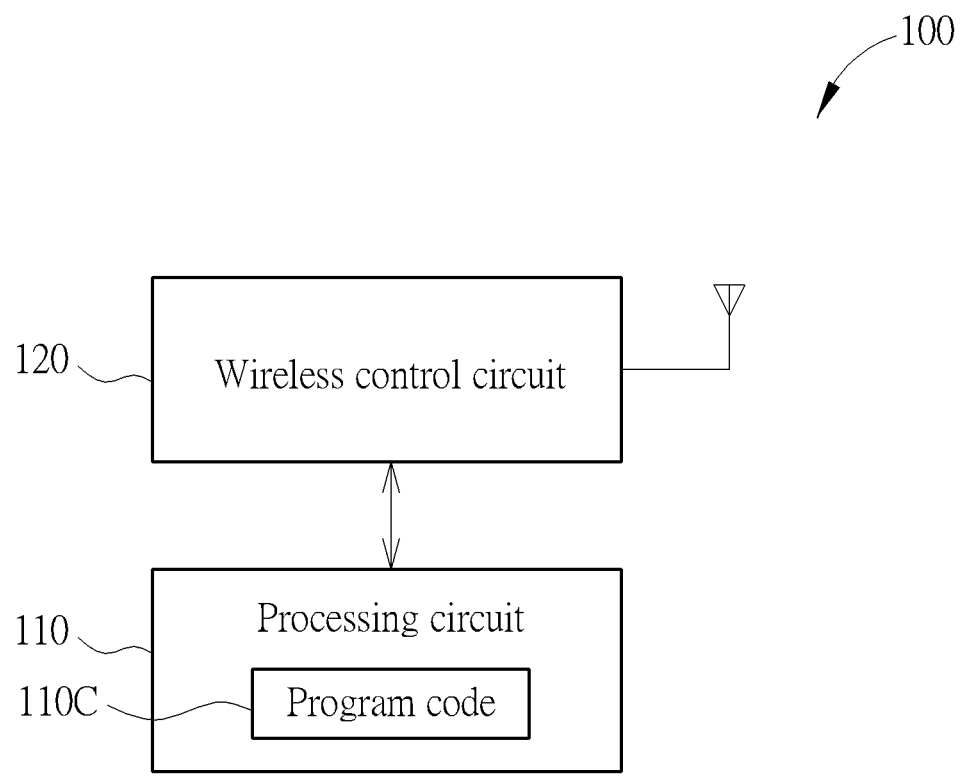
FIG. 1 is a diagram of an apparatus for performing hands-free profile (HFP) control according to an example.

FIG. 1 is a diagram of an apparatus 100 for performing hands-free profile (HFP) control according to an example, where the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. Examples of the electronic device may include, but not limited to, a mobile phone (e.g. a multifunctional mobile phone), a mobile computer (e.g. tablet computer), a personal digital assistant (PDA), and a personal computer such as a laptop computer or desktop computer.

As shown in FIG. 1, the apparatus 100 comprises a processing circuit 110 and a wireless control circuit 120, which is typically coupled to an antenna such as that shown in FIG. 1, where the processing circuit 110 (more particularly, the processing circuit 110 executing the program code 110C such as an operating system and applications) is arranged to control operations of the electronic device, and the wireless control circuit 120 is arranged to perform wireless communication control for the electronic device. Please note that the processing circuit 110 can be selectively implemented with the mixed scheme utilizing software (or firmware) module running on hardware circuit(s), or implemented with the pure hardware scheme. For example, the processing circuit 110 may comprise a processor and associated hardware circuits implemented by using at least one printed circuit board (PCB) on which the processor can be installed, and the aforementioned associated hardware circuits may comprise at least one memory (not shown) such as at least one random access memory (RAM) and/or at least one non-volatile memory (e.g. an electrically erasable programmable read only memory (EEPROM) or a Flash memory), where at least one program code 110C (e.g. one or more sets of program codes) may be stored in the aforementioned at least one memory in advance and retrieved by the processing circuit 110 (more particularly, the processor mentioned above), for running on the processing circuit 110 as illustrated in FIG. 1. This is for illustrative purposes only, and is not meant to be a limitation. In another example, the processing circuit 110 may be implemented as pure hardware circuit(s), where the aforementioned program code 110C is imbedded therein.

In addition, the processing circuit 110 is further arranged to establish, by utilizing the wireless control circuit 120, a plurality of Bluetooth (BT)-Asynchronous Connection-Less (ACL) links between the electronic device and a plurality of wireless accessory devices (e.g. BT devices such as BT headsets, etc.), respectively. The processing circuit 110 may set (more particularly, dynamically update) a default-active-device parameter in a device information table to be a unique identification of a specific wireless accessory device of the plurality of wireless accessory devices, in order to maintain a single BT-Synchronous Connection-Oriented (SCO) link between the electronic device and the specific wireless accessory device according to the default-active-device parameter, where the device information table can be stored within the electronic device, and more particularly can be stored in a storage unit such as the aforementioned at least one memory. For example, the unique identification can be a Bluetooth hardware device address (BD_ADDR), which can be referred to as BT address in the following description, the electronic device can be an Audio Gateway (AG) device, and the plurality of wireless accessory devices can be Hands-Free Unit (HF) devices. More particularly, the electronic device such as the AG device may maintain a plurality of unique BT addresses corresponding to the plurality of wireless accessory devices such as the HF devices in the device information table, where each unique BT address in the device information table represents one of the HF devices.

In practice, both of the electronic device and the plurality of wireless accessory devices may be implemented to comply with the BT specifications. Please refer to the BT specifications (e.g. HFP 1.6 such as V16r00) for some implementation details.

Figure 2:
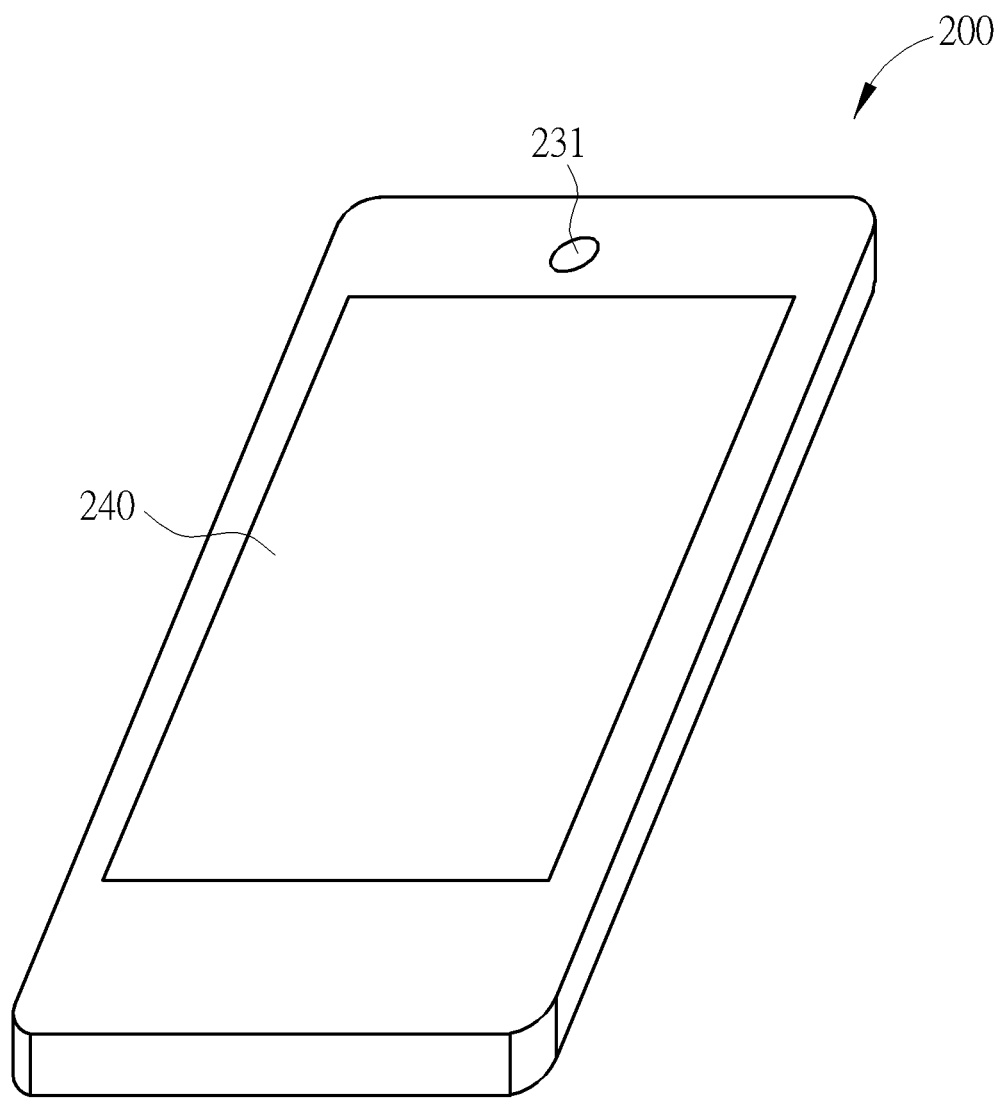
FIG. 2 illustrates the apparatus shown in FIG. 1 according to an example, where the apparatus of this example is a mobile phone.

FIG. 2 illustrates the apparatus 100 shown in FIG. 1 according to an example, where the apparatus 100 of this example can be a mobile phone 200. In the example shown in FIG. 2, the mobile phone 200 may comprise a camera module 231 such as a front camera module that is capable of capturing images, and may further comprise a touch-sensitive screen 240, which can be utilized for displaying information for the mobile phone 200 and utilized for inputting user control.

Figure 3:
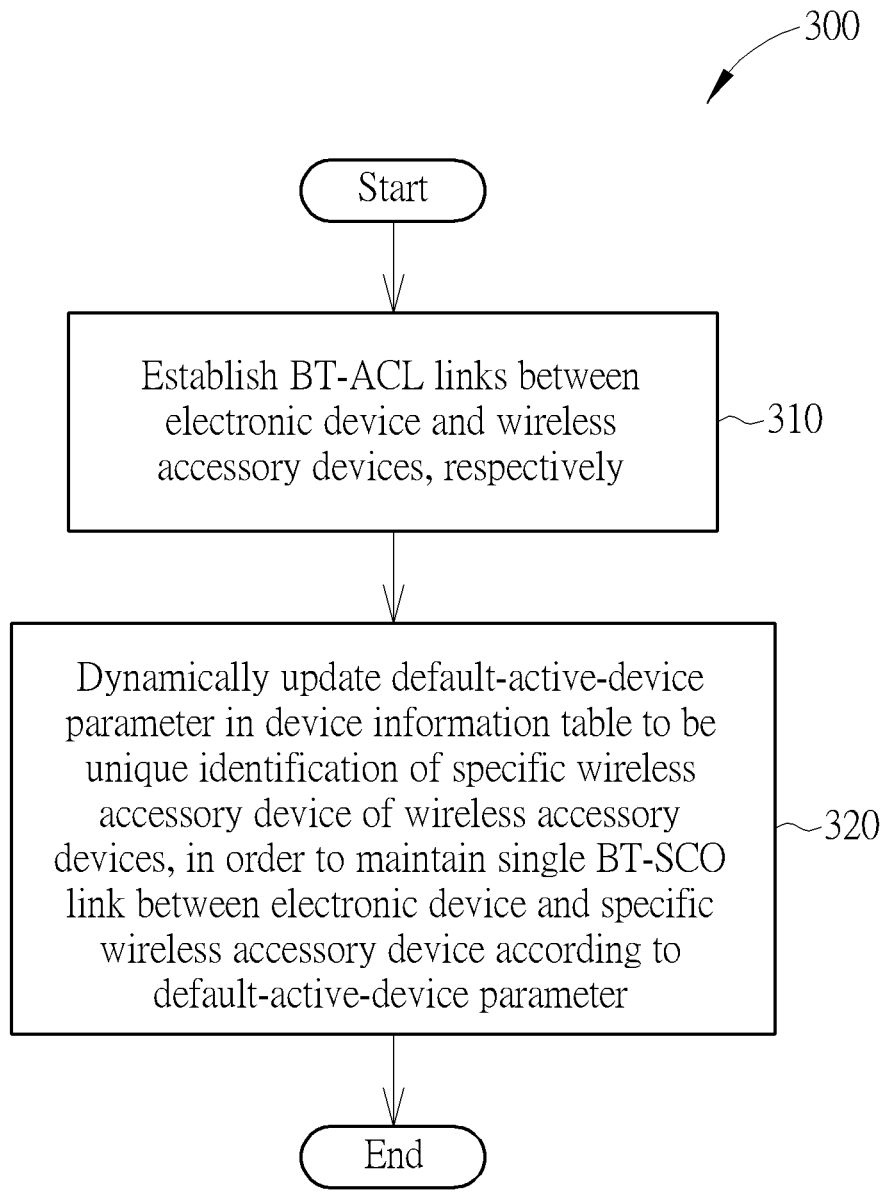
FIG. 3 illustrates a flowchart of a method for performing HFP control according to an example.

FIG. 3 illustrates a flowchart of a method 300 for performing HFP control according to an example. The method 300 shown in FIG. 3 can be applied to the apparatus 100 shown in FIG. 1 (more particularly, the mobile phone 200 of the example shown in FIG. 2), and can be applied to the processing circuit 110 thereof (more particularly, the processing circuit 110 executing the program code 110C such as the operating system and the application mentioned above). For example, the program code 110C may be provided through a computer program product having program instructions for instructing a processor such as that mentioned above to perform the method 300 shown in FIG. 3, where the computer program product may be implemented as a non-transitory computer-readable medium (e.g. a floppy disk or a compact disc-read only memory (CD-ROM)) storing the program instructions or an equivalent version thereof, such as a software package for being installed. The method is described as follows.

In Step 310, the processing circuit 110 establishes, by utilizing the wireless control circuit 120, the plurality of BT-ACL links between the electronic device and the plurality of wireless accessory devices (e.g. the aforementioned BT devices such as the aforementioned BT headsets, etc.), respectively.

In Step 320, the processing circuit 110 dynamically updates the default-active-device parameter in the device information table to be the unique identification of the specific wireless accessory device of the plurality of wireless accessory devices (e.g. the BD_ADDR of the specific wireless accessory device), in order to maintain the single BT-SCO link between the electronic device and the specific wireless accessory device according to the default-active-device parameter, where the device information table comprises a plurality of unique identifications of the wireless accessory devices of which the BT-ACL links are established with the electronic device. Typically, each of the unique identifications of the wireless accessory devices can be a BD_ADDR (i.e. the unique identifications of the wireless accessory devices can be a plurality of BD_ADDRs of the wireless accessory devices, respectively), and the plurality of unique BT addresses mentioned above can be taken as an example of the plurality of unique identifications. For example, the processing circuit 110 may dynamically update the default-active-device parameter to be the unique identification of the specific wireless accessory device of the plurality of wireless accessory devices, in order to maintain only one BT-SCO link such as the single BT-SCO link between the electronic device and the specific wireless accessory device, and more particularly, to prevent multiple BT-SCO links between the electronic device and at least one portion of the plurality of wireless accessory devices.

According to this example, when it is detected that the default-active-device parameter has been updated to be the unique identification of the specific wireless accessory device (e.g. a first wireless accessory device of the plurality of wireless accessory devices), the processing circuit 110 prevents another wireless accessory device of the plurality of wireless accessory devices (e.g. a second wireless accessory device of the plurality of wireless accessory devices, or any wireless accessory device of the plurality of wireless accessory devices except for the first wireless accessory device) from triggering the establishment of another BT-SCO link. This is for illustrative purposes only, and is not meant to be a limitation. In another example, when it is detected that the single BT-SCO link has been established, the processing circuit 110 may send a command to another wireless accessory device of the plurality of wireless accessory devices (e.g. the second wireless accessory device, or any wireless accessory device of the plurality of wireless accessory devices except for the first wireless accessory device) to notify the other wireless accessory device of an inactive state, in order to prevent the other wireless accessory device from triggering establishment of another BT-SCO link.

In some examples, when it is detected that an outgoing call is operated through another wireless accessory device of the plurality of wireless accessory devices (e.g. the second wireless accessory device, or any wireless accessory device of the plurality of wireless accessory devices except for the first wireless accessory device), the processing circuit 110 may dynamically update the default-active-device parameter to be a unique identification of the other wireless accessory device of the plurality of wireless accessory devices, and establishes a single BT-SCO link between the electronic device and the other wireless accessory device. More particularly, when it is detected that the outgoing call is operated through the other wireless accessory device of the plurality of wireless accessory devices (e.g. the second wireless accessory device, or any wireless accessory device of the plurality of wireless accessory devices except for the first wireless accessory device), the processing circuit 110 cancels the single BT-SCO link between the electronic device and the specific wireless accessory device (e.g. the first wireless accessory device), in order to prevent multiple BT-SCO links between the electronic device and at least one portion of the plurality of wireless accessory devices.

In some examples, before establishing another BT-SCO link between the electronic device and another wireless accessory device of the plurality of wireless accessory devices (e.g. the second wireless accessory device, or any wireless accessory device of the plurality of wireless accessory devices except for the first wireless accessory device), the processing circuit 110 cancels any existing BT-SCO link between the electronic device and one of the plurality of wireless accessory devices, such as the BT-SCO link between the electronic device and the specific wireless accessory device (e.g. the first wireless accessory device), where the aforementioned existing BT-SCO link comprises the BT-SCO link between the electronic device and the specific wireless accessory device.

In some examples, before establishing the plurality of BT-ACL links between the electronic device and the plurality of wireless accessory devices respectively, the processing circuit 110 may cancel an existing BT-ACL link between the electronic device and one of the plurality of wireless accessory devices, where the establishment of the existing BT-ACL link is previously triggered by the one of the plurality of wireless accessory devices.

In some examples, based on the aforementioned device information table, the processing circuit 110 may determine whether to control an operation of at least one wireless accessory device of the plurality of wireless accessory devices. For example, when it is detected that there is an incoming call, the processing circuit 110 sends at least one command to control all of the plurality of wireless accessory devices indicated by the plurality of unique identifications in the device information table to ring. Then, the user of the electronic device may pick up the incoming call through the specific wireless accessory device. In practice, when it is detected that the incoming call is picked up through the specific wireless accessory device (e.g. in a situation where a command ATA is sent from the specific wireless accessory device to the electronic device and is detected), the processing circuit 110 updates the default-active-device parameter to be the unique identification of the specific wireless accessory device. As a result, the processing circuit 110 may maintain the single BT-SCO link between the electronic device and the specific wireless accessory device (e.g. the first wireless accessory device) according to the default-active-device parameter in the device information table. For example, when the single BT-SCO link is established between the electronic device and the specific wireless accessory device of the plurality of wireless accessory (e.g. the first wireless accessory device), the processing circuit 110 controls the electronic device to ignore a request from any other wireless accessory device within the plurality of wireless accessory devices (e.g. the second wireless accessory device, or any wireless accessory device of the plurality of wireless accessory devices except for the first wireless accessory device) according to the default-active-device parameter in the device information table.

In some examples, based on the device information table comprising the default-active-device parameter mentioned above, the processing circuit 110 may determine whether to control an operation of at least one wireless accessory device of the plurality of wireless accessory devices. For example, based on the device information table comprising the defaultactive-device parameter, the processing circuit 110 may control the electronic device to perform an operation in response to a request from the specific wireless accessory device. In another example, based on the device information table comprising the default-active-device parameter, the processing circuit 110 may control the electronic device to be irresponsive to a request from another wireless accessory device of the plurality of wireless accessory devices.

Figure 4:
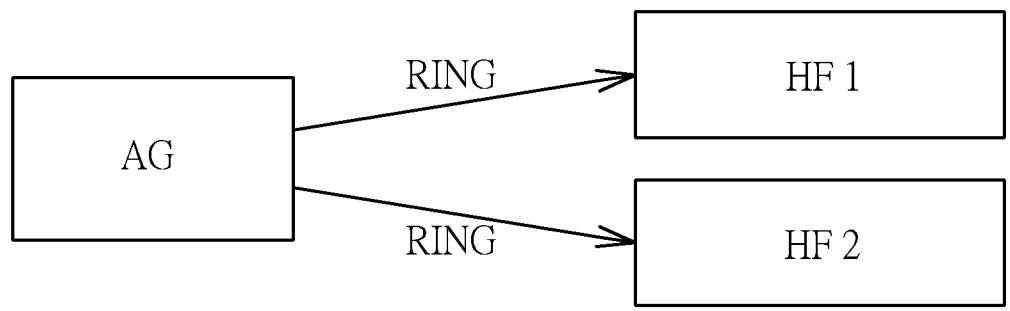
FIG. 4 illustrates an incoming call control scheme involved with the method shown in FIG. 3 according to an example.

FIG. 4 illustrates an incoming call control scheme involved with the method 300 shown in FIG. 3 according to an example. The notation "AG" stands for the AG device mentioned above, and the notations "HF 1" and "HF 2" stand for two of the HF devices mentioned above.

In this example, based on the aforementioned device information table, the processing circuit 110 may determine whether to control an operation of at least one wireless accessory device of the plurality of wireless accessory devices. More particularly, when the plurality of BT-ACL links between the electronic device and the plurality of wireless accessory devices (e.g. the HF devices in this example) are established, the processing circuit 110 in the electronic device (e.g. the AG device in this example) may maintain the device information table to indicate related information of these BT-ACL links. For example, in addition to the default-active-device parameter, the device information table may comprise the device information of all of the plurality of wireless accessory devices, such as the unique BT addresses of the two HF devices. As shown in FIG. 4, when it is detected that there is an incoming call such as that mentioned above, the processing circuit 110 send the same command RING to control all of the plurality of wireless accessory devices listed in the device information table to ring, since the device information table comprises the device information of all of the plurality of wireless accessory devices (e.g. the BT addresses of the two HF devices).

Figure 5:
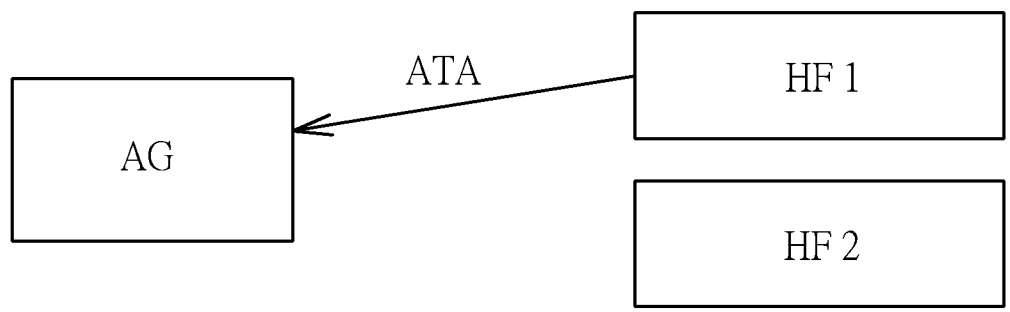
FIG. 5 illustrates an incoming call control scheme involved with the method shown in FIG. 3 according to another example.

FIG. 5 illustrates an incoming call control scheme involved with the method 300 shown in FIG. 3 according to another example. In this example, when it is detected that the incoming call is picked up through the specific wireless accessory device such as the HF device labeled "HF 1" (e.g. in a situation where the command ATA with (or carrying) the unique BT address of the HF device "HF 1" is sent from the specific wireless accessory device to the electronic device and is detected), the processing circuit 110 in the electronic device (e.g. the AG device in this example) updates the default-active-device parameter to be the unique identification (e.g. the BT address) of the specific wireless accessory device. Thus, the AG device sets the HF device labeled "HF 1" as the default active device. As a result, after the aforementioned single BT-SCO link is established, the user may talk by using the specific wireless accessory device such as the HF device labeled "HF 1", rather than another wireless accessory device such as the HF device labeled "HF 2" in this example.

Figure 6:
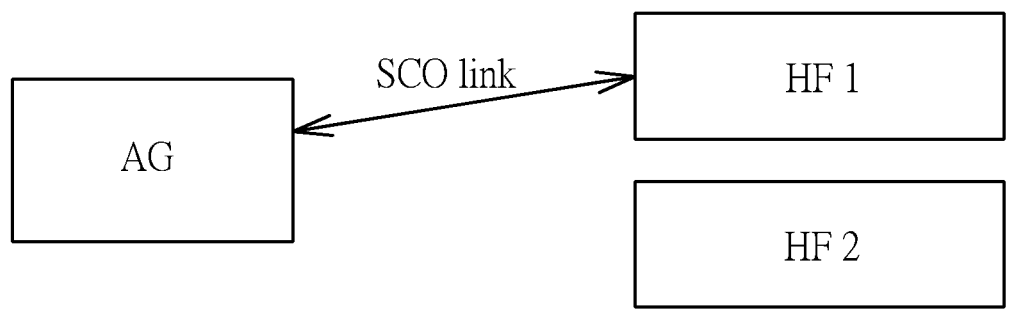
FIG. 6 illustrates an incoming call control scheme involved with the method shown in FIG. 3 according to another example.

FIG. 6 illustrates an incoming call control scheme involved with the method 300 shown in FIG. 3 according to another example. In this example, when it is detected that the incoming call is picked up through the specific wireless accessory device such as the HF device labeled "HF 1" (e.g. in a situation where the command ATA with (or carrying) the unique BT address of the HF device "HF 1" is sent from the specific wireless accessory device to the electronic device and is detected), the processing circuit 110 in the electronic device (e.g. the AG device in this example) establishes the single BT-SCO link between the electronic device and the specific wireless accessory device, and more particularly, the SCO link between the AG device and the HF device labeled "HF 1" in this example. Please note that, as the processing circuit 110 dynamically updates the default-active-device parameter in the aforementioned device information table to be the unique identification of the specific wireless accessory device, based on the device information table, the processing circuit 110 maintains the single BT-SCO link between the electronic device and the specific wireless accessory device and prevents the aforementioned multiple BT-SCO links.

Figure 7:
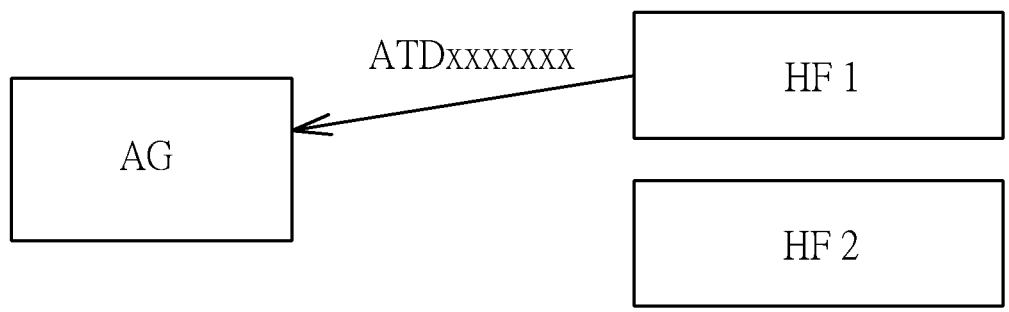
FIG. 7 illustrates an outgoing call control scheme involved with the method shown in FIG. 3 according to an example.

FIG. 7 illustrates an outgoing call control scheme involved with the method 300 shown in FIG. 3 according to an example. In a situation where the plurality of BT-ACL links between the electronic device and the plurality of wireless accessory devices (e.g. the HF devices in this example) are established, the processing circuit 110 in the electronic device (e.g. the AG device in this example) may maintain the device information table to indicate the aforementioned related information of these BT-ACL links (e.g. the AG device may maintain a plurality of unique BT addresses corresponding to the plurality of wireless accessory devices in the device information table).

In this example, when it is detected that the user of the electronic device dials out for the outgoing call through the specific wireless accessory device such as the HF device labeled "HF 1" (e.g. in a situation where the command ATDxxxxxxx with (or carrying) the unique BT address of the HF device "HF 1" is sent from the specific wireless accessory device to the electronic device and is detected, with the notation "xxxxxxx" representing the phone number), the processing circuit 110 in the electronic device (e.g. the AG device in this example) updates the default-active-device parameter to be the unique identification of the specific wireless accessory device. Thus, the AG device sets the HF device labeled "HF 1" as the default active device. As a result, the user may talk by using the specific wireless accessory device such as the HF device labeled "HF 1", rather than another wireless accessory device such as the HF device labeled "HF 2" in this example.

Figure 8:
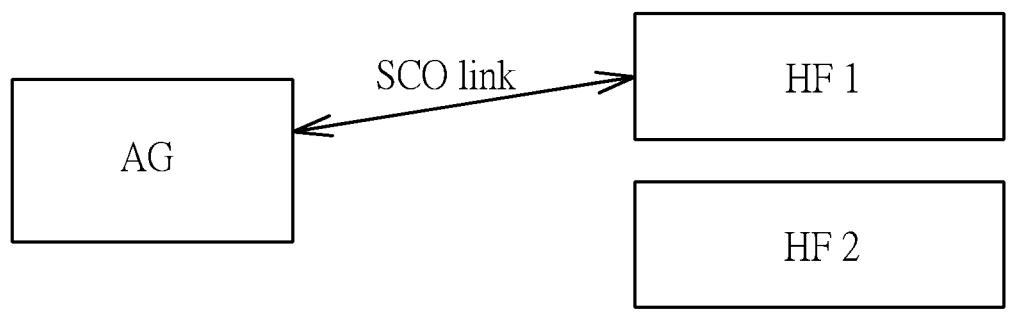
FIG. 8 illustrates an outgoing call control scheme involved with the method shown in FIG. 3 according to another example.

FIG. 8 illustrates an outgoing call control scheme involved with the method 300 shown in FIG. 3 according to another example. In this example, when it is detected that the user of the electronic device dials out for the outgoing call through the specific wireless accessory device such as the HF device labeled "HF 1" (e.g. in a situation where the command ATDxxxxxxx with (or carrying) the unique BT address of the HF device "HF 1" is sent from the specific wireless accessory device to the electronic device and is detected), the processing circuit 110 in the electronic device (e.g. the AG device in this example) establishes the single BT-SCO link between the electronic device and the specific wireless accessory device, and more particularly, the SCO link between the AG device and the HF device labeled "HF 1" in this example. Please note that, as the processing circuit 110 dynamically updates the parameter in the aforementioned device information table to be the unique of the specific wireless accessory device, based on the device information table, the processing circuit 110 maintains the single BT-SCO link between the electronic device and the specific wireless accessory device and prevents the aforementioned multiple BT-SCO links.

Figure 9:
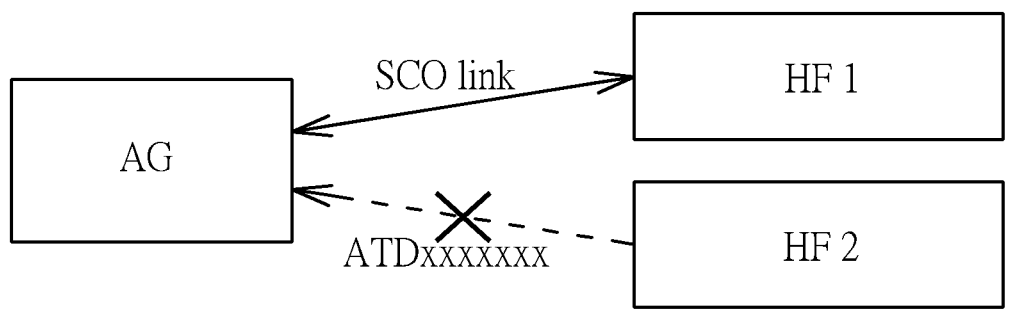
FIG. 9 illustrates an ongoing call control scheme involved with the method shown in FIG. 3 according to an example.

FIG. 9 illustrates an ongoing call control scheme involved with the method 300 shown in FIG. 3 according to an example. After the processing circuit 110 in the electronic device (e.g. the AG device in this example) establishes the single BT-SCO link between the electronic device and the specific wireless accessory device, such as the SCO link between the AG device and the HF device labeled "HF 1" in this example, based on the device information table comprising the default-active-device parameter, the processing circuit 110 controls the electronic device to be irresponsive to any request from another wireless accessory device such as the HF device labeled "HF 2" in this example, in order to prevent the ongoing call from being interrupted or controlled by the other wireless accessory device (e.g. the HF device labeled "HF 2"). Thus, the audio path will not be switched to the other wireless accessory device. As shown in FIG. 9, the HF device labeled "HF 2" sends the command ATDxxxxxxx with (or carrying) the unique BT address of the HF device "HF 2" to the AG device and tries to dial out, where the request such as the command ATDxxxxxxx is ignored by the AG device since the default-active-device parameter indicates that the default active device is the HF device labeled "HF 1" at this moment.

Figure 10:
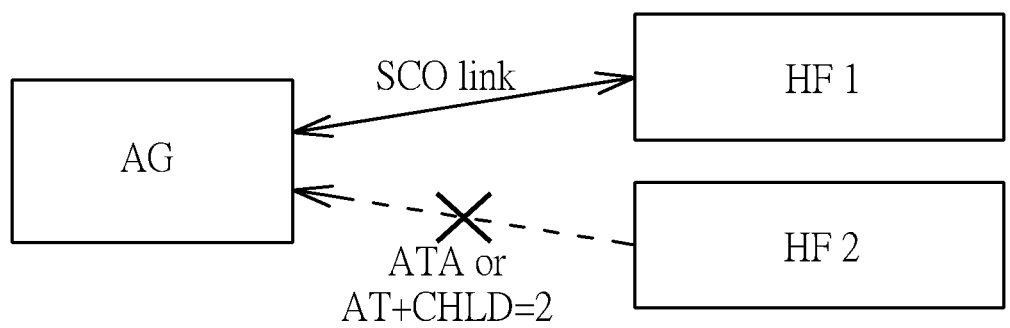
FIG. 10 illustrates an ongoing call control scheme involved with the method shown in FIG. 3 according to another example.

FIG. 10 illustrates an ongoing call control scheme involved with the method 300 shown in FIG. 3 according to another example. This example is a variation of the example shown in FIG. 9. As shown in FIG. 10, the HF device labeled "HF 2" may send the command ATA or the command AT+CHLD=2 to the AG device and tries to accept the waiting call, where the request such as the command ATA or the command AT+CHLD=2 is ignored by the AG device since the default-active-device parameter indicates that the default active device is the HF device labeled "HF 1" at this moment. Similar descriptions for this variation are not repeated in detail here.

Figure 11:
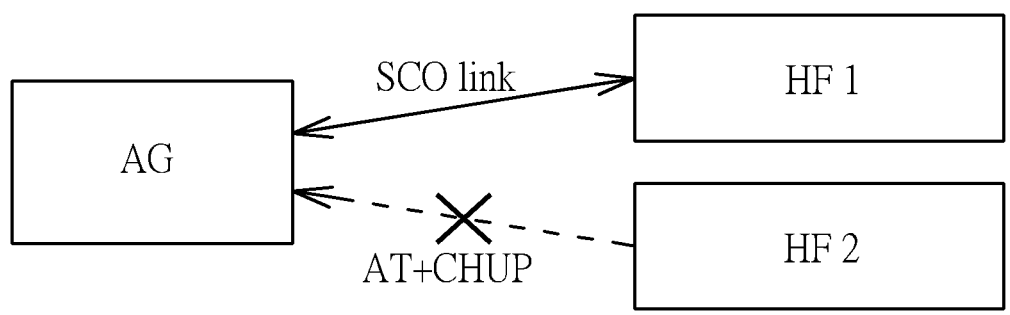
FIG. 11 illustrates an ongoing call control scheme involved with the method shown in FIG. 3 according to another example.

FIG. 11 illustrates an ongoing call control scheme involved with the method 300 shown in FIG. 3 according to another example. This example is another variation of the example shown in FIG. 9. As shown in FIG. 11, the HF device labeled "HF 2" may send the command AT+CHUP to the AG device and tries to hang up the phone call, where the request such as the command AT+CHUP is ignored by the AG device since the default-active-device parameter indicates that the default active device is the HF device labeled "HF 1" at this moment. Similar descriptions for this variation are not repeated in detail here.

Figure 12:
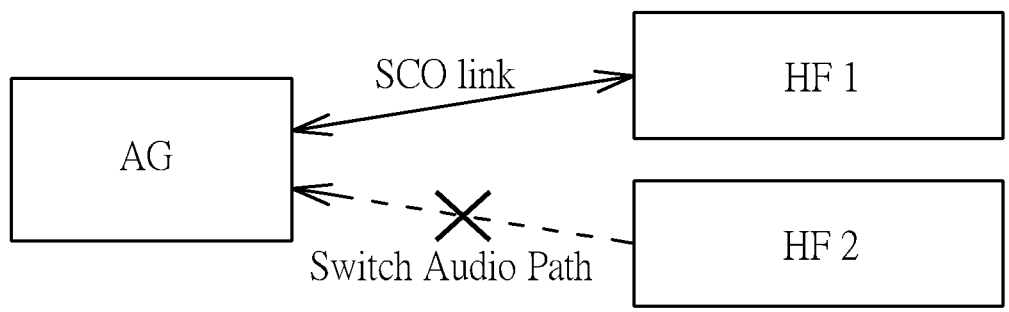
FIG. 12 illustrates an ongoing call control scheme involved with the method shown in FIG. 3 according to another example.

FIG. 12 illustrates an ongoing call control scheme involved with the method 300 shown in FIG. 3 according to another example. This example is another variation of the example shown in FIG. 9. As shown in FIG. 12, the HF device labeled "HF 2" may try to switch the audio path to or from the AG device, where the request of switching the audio path is ignored by the AG device since the default-active-device parameter indicates that the default active device is the HF device labeled "HF 1" at this moment. Similar descriptions for this variation are not repeated in detail here.

Figure 13:
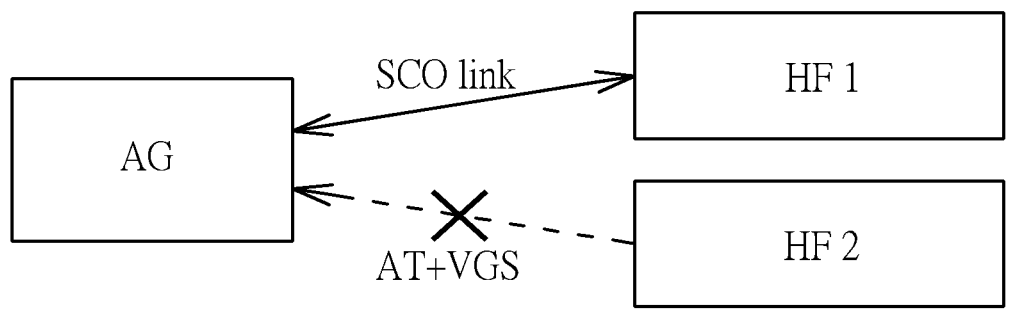
FIG. 13 illustrates an ongoing call control scheme involved with the method shown in FIG. 3 according to another example.

FIG. 13 illustrates an ongoing call control scheme involved with the method 300 shown in FIG. 3 according to another example. This example is another variation of the example shown in FIG. 9. As shown in FIG. 13, the HF device labeled "HF 2" may send the command AT+VGS to the AG device and tries to adjust the voice call volume, where the request such as the command AT+VGS is ignored by the AG device since the default-active-device parameter indicates that the default active device is the HF device labeled "HF 1" at this moment. Similar descriptions for this variation are not repeated in detail here.

According to an aspect, the aforementioned computer program product can be composed of several code segments. In addition, after these code segments are loaded into the apparatus 100 (more particularly, the processing circuit 110) and are executed, the steps and features of the method shown in FIG. 3 can be implemented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing hands-free profile (HFP) control, the method being applied to an electronic device, the method comprising the steps of:
   establishing a plurality of Bluetooth (BT)-Asynchronous Connection-Less (ACL) links between the electronic device and a plurality of wireless accessory devices, respectively, and maintaining the plurality of BT-ACL links; and
   dynamically updating a default-active-device parameter in a device information table to be a unique identification of a specific wireless accessory device of the plurality of wireless accessory devices, in order to maintain a single BT-Synchronous Connection-Oriented (SCO) link between the electronic device and the specific wireless accessory device according to the default-active-device parameter, wherein the device information table comprises a plurality of unique identifications of the wireless accessory devices of which the BT-ACL links are currently maintained with the electronic device.

2. The method of claim 1, wherein each of the unique identifications of the wireless accessory devices is a Bluetooth hardware device address (BD_ADDR).

3. The method of claim 1, wherein the step of dynamically updating the default-active-device parameter in the device information table to be the unique identification of the specific wireless accessory device of the plurality of wireless accessory devices in order to maintain the single BT-SCO link between the electronic device and the specific wireless accessory device further comprises:
   when it is detected that the default-active-device parameter has been updated to be the unique identification of the specific wireless accessory device, preventing another wireless accessory device of the plurality of wireless accessory devices from triggering establishment of another BT-SCO link.

4. The method of claim 1, wherein the step of dynamically updating the default-active-device parameter in the device information table to be the unique identification of the specific wireless accessory device of the plurality of wireless accessory devices in order to maintain the single BT-SCO link between the electronic device and the specific wireless accessory device further comprises:
   when it is detected that an outgoing call is operated through another wireless accessory device of the plurality of wireless accessory devices, dynamically updating the default-active-device parameter to be a unique identification of the other wireless accessory device of the plurality of wireless accessory devices, and establishing a single BT-SCO link between the electronic device and the another wireless accessory device.

5. The method of claim 4, further comprising:
   when it is detected that the outgoing call is operated through the other wireless accessory device of the plurality of wireless accessory devices, canceling the single BT-SCO link between the electronic device and the specific wireless accessory device.

6. The method of claim 5, wherein the step of canceling the single BT-SCO link between the electronic device and the specific wireless accessory device further comprises:
   when it is detected that the outgoing call is operated through the other wireless accessory device of the plurality of wireless accessory devices, canceling the single BT-SCO link between the electronic device and the specific wireless accessory device, in order to prevent multiple BT-SCO links between the electronic device and at least one portion of the plurality of wireless accessory devices.

7. The method of claim 1, further comprising:
before establishing another BT-SCO link between the electronic device and another wireless accessory device of the plurality of wireless accessory devices, canceling any existing BT-SCO link between the electronic device and one of the plurality of wireless accessory devices.

8. The method of claim 7, wherein the existing BT-SCO link comprises the BT-SCO link between the electronic device and the specific wireless accessory device.

9. The method of claim 1, further comprising:
when it is detected that there is an incoming call, controlling all of the plurality of wireless accessory devices in the device information table to ring; and
when it is detected that the incoming call is picked up through the specific wireless accessory device, updating the default-active-device parameter to be the unique identification of the specific wireless accessory device.

10. The method of claim 1, further comprising:
when the single BT-SCO link is established between the electronic device and the specific wireless accessory device of the plurality of wireless accessory, controlling the electronic device to ignore a request from any other wireless accessory device within the plurality of wireless accessory devices according to the default-active-device parameter in the device information table.

11. An apparatus for performing hands-free profile (HFP) control, the apparatus comprising at least one portion of an electronic device, the apparatus comprising:
a wireless control circuit arranged to perform wireless communication control for the electronic device; and
a processing circuit, coupled to the wireless control circuit, arranged to establish, by utilizing the wireless control circuit, a plurality of Bluetooth (BT)-Asynchronous Connection-Less (ACL) links between the electronic device and a plurality of wireless accessory devices, respectively, and maintain the plurality of BT-ACL links, wherein the processing circuit dynamically updates a default-active-device parameter in a device information table to be a unique identification of a specific wireless accessory device of the plurality of wireless accessory devices, in order to maintain a single BT-Synchronous Connection-Oriented (SCO) link between the electronic device and the specific wireless accessory device according to the default-active-device parameter, wherein the device information table comprises a plurality of unique identifications of the wireless accessory devices of which the BT-ACL links are currently maintained with the electronic device.

12. The apparatus of claim 11, wherein each of the unique identifications of the wireless accessory devices is a Bluetooth hardware device address (BD_ADDR).

13. The apparatus of claim 11, wherein when it is detected that the default-active-device parameter has been updated to be the unique identification of the specific wireless accessory device, the processing circuit prevents another wireless accessory device of the plurality of wireless accessory devices from triggering establishment of another BT-SCO link.

14. The apparatus of claim 11, wherein when it is detected that an outgoing call is operated through another wireless accessory device of the plurality of wireless accessory devices, the processing circuit dynamically updates the default-active-device parameter to be a unique identification of the other wireless accessory device of the plurality of wireless accessory devices, and establishes a single BT-SCO link between the electronic device and the other wireless accessory device.

15. The apparatus of claim 14, wherein when it is detected that the outgoing call is operated through the other wireless accessory device of the plurality of wireless accessory devices, the processing circuit cancels the single BT-SCO link between the electronic device and the specific wireless accessory device.

16. The apparatus of claim 15, wherein when it is detected that the outgoing call is operated through the other wireless accessory device of the plurality of wireless accessory devices, the processing circuit cancels the single BT-SCO link between the electronic device and the specific wireless accessory device, in order to prevent multiple BT-SCO links between the electronic device and at least one portion of the plurality of wireless accessory devices.

17. The apparatus of claim 11, wherein before establishing another BT-SCO link between the electronic device and another wireless accessory device of the plurality of wireless accessory devices, the processing circuit cancels any existing BT-SCO link between the electronic device and one of the plurality of wireless accessory devices.

18. The apparatus of claim 17, wherein the existing BT-SCO link comprises the BT-SCO link between the electronic device and the specific wireless accessory device.

19. The apparatus of claim 11, wherein when it is detected that there is an incoming call, the processing circuit sends at least one command to control all of the plurality of wireless accessory devices indicated by the plurality of unique identifications in the device information table to ring; and when it is detected that the incoming call is picked up through the specific wireless accessory device, the processing circuit updates the default-active-device parameter to be the unique identification of the specific wireless accessory device.

20. The apparatus of claim 11, wherein when the single BT-SCO link is established between the electronic device and the specific wireless accessory device of the plurality of wireless accessory, the processing circuit controls the electronic device to ignore a request from any other wireless accessory device within the plurality of wireless accessory devices according to the default-active-device parameter in the device information table.

21. A computer program product, having program instructions stored in a non-transitory computer readable medium for instructing a processor of an electronic device to perform a method comprising the steps of:
establishing a plurality of Bluetooth (BT)-Asynchronous Connection-Less (ACL) links between the electronic device and a plurality of wireless accessory devices, respectively, and maintaining the plurality of BT-ACL links; and
dynamically updating a default-active-device parameter in a device information table to be a unique identification of a specific wireless accessory device of the plurality of wireless accessory devices, in order to maintain a single BT-Synchronous Connection-Oriented (SCO) link between the electronic device and the specific wireless accessory device according to the default-active-device parameter, wherein the device information table comprises a plurality of unique identifications of the wireless accessory devices of which the BT-ACL links are currently maintained with the electronic device.

* * * * *